US011947295B2

(12) United States Patent
Fujiwara

(10) Patent No.: US 11,947,295 B2
(45) Date of Patent: Apr. 2, 2024

(54) HEATING DEVICE, FIXING DEVICE, AND IMAGE FORMING APPARATUS

(71) Applicant: Hitoshi Fujiwara, Kanagawa (JP)

(72) Inventor: Hitoshi Fujiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/840,013

(22) Filed: Jun. 14, 2022

(65) Prior Publication Data

US 2023/0004110 A1 Jan. 5, 2023

(30) Foreign Application Priority Data

Jul. 5, 2021 (JP) ................................ 2021-111546

(51) Int. Cl.
*G03G 15/20* (2006.01)

(52) U.S. Cl.
CPC ..... *G03G 15/2064* (2013.01); *G03G 15/2053* (2013.01)

(58) Field of Classification Search
CPC ....................... G03G 15/2064; G03G 15/2053
See application file for complete search history.

(56) References Cited

U.S. PATENT DOCUMENTS

2013/0209123 A1* 8/2013 Waida ................ G03G 15/2039 399/68
2013/0272758 A1* 10/2013 Hayashi ............. G03G 15/2017 399/329
2015/0125193 A1* 5/2015 Ishii ................... G03G 15/2042 399/329
2015/0286165 A1* 10/2015 Suzuki ................. G03G 15/167 399/313
2017/0003634 A1* 1/2017 Samei ................ G03G 15/2053
2018/0011435 A1* 1/2018 Tsubotani .......... G03G 15/2053
2019/0196374 A1* 6/2019 Adachi .............. G03G 15/2042

(Continued)

FOREIGN PATENT DOCUMENTS

JP H09-197864 A 7/1997
JP 10-198206 7/1998

(Continued)

OTHER PUBLICATIONS

Extended European Search Report dated Nov. 21, 2022 issued in corresponding European Appln. No. 22179285.6.

*Primary Examiner* — Sevan A Aydin
(74) *Attorney, Agent, or Firm* — Harness, Dickey & Pierce, P.L.C.

(57) ABSTRACT

A heating device includes a heater, a rotator, and a pressure rotator. The heater includes resistive heat generators forming a heat generation area and has a separation area formed by the resistive heat generators. The pressure rotator includes a first region and a second region. The first region faces the heater in a range of 20 mm from a center position of the heat generation area toward an end thereof in the arrangement direction. The second region faces the heater in at least a part of a range of 30 mm from a center position of the separation area toward the center position of the heat generation area. An outer diameter of the pressure rotator increases from the center toward the end. The outer diameter of the second region increases at an increasing rate larger than an increasing rate of the outer diameter of the first region.

15 Claims, 14 Drawing Sheets

(56) References Cited

U.S. PATENT DOCUMENTS

| | | | | |
|---|---|---|---|---|
| 2020/0103797 | A1 | 4/2020 | Furuichi | |
| 2020/0117124 | A1 | 4/2020 | Furuichi | |
| 2020/0174407 | A1 | 6/2020 | Furuichi | |
| 2020/0174408 | A1 | 6/2020 | Furuichi et al. | |
| 2020/0292974 | A1* | 9/2020 | Fujimoto | G03G 15/2053 |
| 2021/0181661 | A1 | 6/2021 | Seki | |

FOREIGN PATENT DOCUMENTS

| | | |
|---|---|---|
| JP | 2001-159858 A | 6/2001 |
| JP | 2020-086277 | 6/2020 |

* cited by examiner

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-111546, filed on Jul. 5, 2021, in the Japan Patent Office, the entire disclosure of which is hereby incorporated by reference herein.

BACKGROUND

Technical Field

Embodiments of the present disclosure generally relate to a heating device, a fixing device, and an image forming apparatus.

Related Art

One type of heating device to heat a sheet as a heated member is a fixing device in which heat fixies a toner image onto the sheet. One type of fixing device includes a planar heater including a resistive heat generator on a base, a fixing belt as a rotator, and a pressure roller as a pressure rotator that presses the fixing belt.

SUMMARY

This specification describes an improved heating device that includes a heater, a rotator, and a pressure rotator. The heater includes a base and a plurality of resistive heat generators arranged on the base in an arrangement direction, separated from each other, and forming a heat generation area. The heater has a separation area that includes an entire gap between neighboring ones of the plurality of resistive heat generators in the arrangement direction. The pressure rotator presses the rotator and includes a first region and a second region. The first region faces the heater in a range of 20 mm from a center position of the heat generation area toward an end of the heat generation area in the arrangement direction. The first region has an outer diameter increasing in a direction from the center position of the heat generation area toward the end of the heat generation area. The second region faces the heater in at least a part of a range of 30 mm from a center position of the separation area toward the center position of the heat generation area. The second region has an outer diameter increasing at an increasing rate larger than an increasing rate of the outer diameter of the first region in the direction from the center position of the heat generation area toward the end of the heat generation area.

This specification further describes an improved heating device that includes a heater, a rotator, and a pressure rotator. The heater includes a base and a plurality of resistive heat generators arranged on the base in an arrangement direction, separated from each other, and forming a heat generation area. The heater has a separation area that includes an entire gap between neighboring ones of the plurality of resistive heat generators in the arrangement direction. The pressure rotator presses the rotator and includes a first region and a second region. The second region includes a position corresponding to the separation area. The second region faces the heater in a part of a range from a center position of the separation area to a center position of the heat generation area. The second region has an outer diameter increasing in a direction from the center position of the heat generation area toward an end of the heat generation area. The first region is nearer to a position being on the pressure rotator and facing the center position of the heat generation area than the second region. The first region has an outer diameter increasing at an increasing rate smaller than an increasing rate of the outer diameter of the second region in the direction from the center position of the heat generation area toward the end of the heat generation area.

This specification also describes a fixing device that includes the heating device.

This specification further describes an image forming apparatus including the heating device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
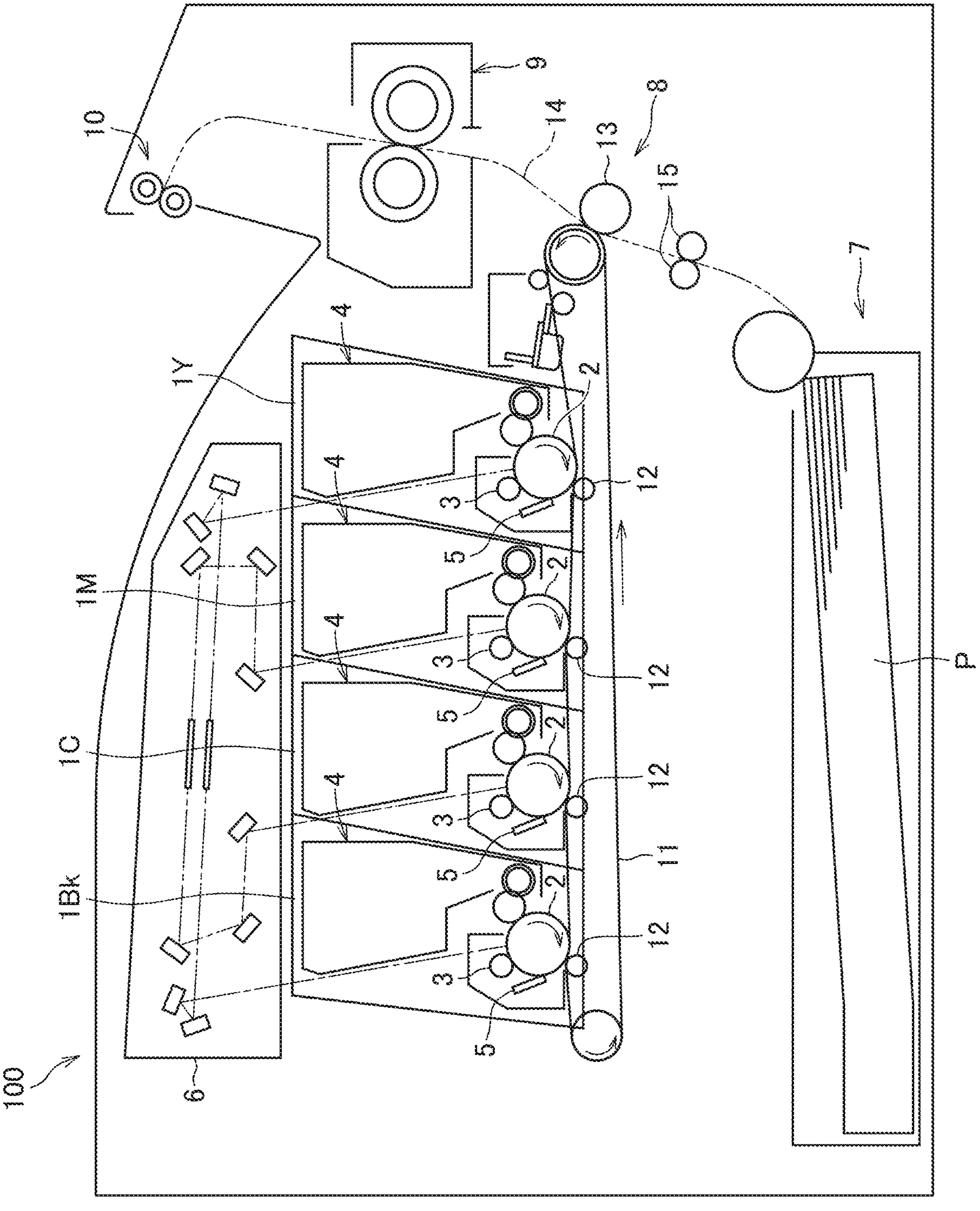
FIG. 1 is a schematic diagram illustrating a configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. Identical reference numerals are assigned to identical components or equivalents and a description of those components is simplified or omitted. Hereinafter, a fixing device incorporated in an image forming apparatus is described as a heating device according to an embodiment of the present disclosure.

FIG. 1 is a schematic diagram illustrating a configuration of the image forming apparatus according to the embodiment of the present disclosure.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk including photoconductors 2 and the charging devices 3, the exposure devices 6, the transfer device 8, and the like configures an image forming device that forms an image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image on each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip therebetween. The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Next, a description is given of a series of print operations of the image forming apparatus 100 with reference to FIG. 1.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2.

The developing device 4 supplies toner to the electrostatic latent image formed on the photoconductor 2, forming a toner image thereon.

The toner image formed on each of the photoconductors 2 reaches the primary transfer nip at each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. Thus, the full color toner image is transferred onto and borne on the sheet P. After the toner image is transferred from each of the photoconductors 2 onto the intermediate transfer belt 11, each of the cleaning devices 5 removes residual toner on each of the photoconductors 2.

After the full color toner image is transferred onto the sheet P, the sheet P is conveyed to the fixing device 9 to fix the toner image on the sheet P. Subsequently, the sheet ejection device 10 ejects the sheet P outside the image forming apparatus 100, and the series of print operations are completed.

Next, a configuration of the fixing device 9 is described.

Figure 2:
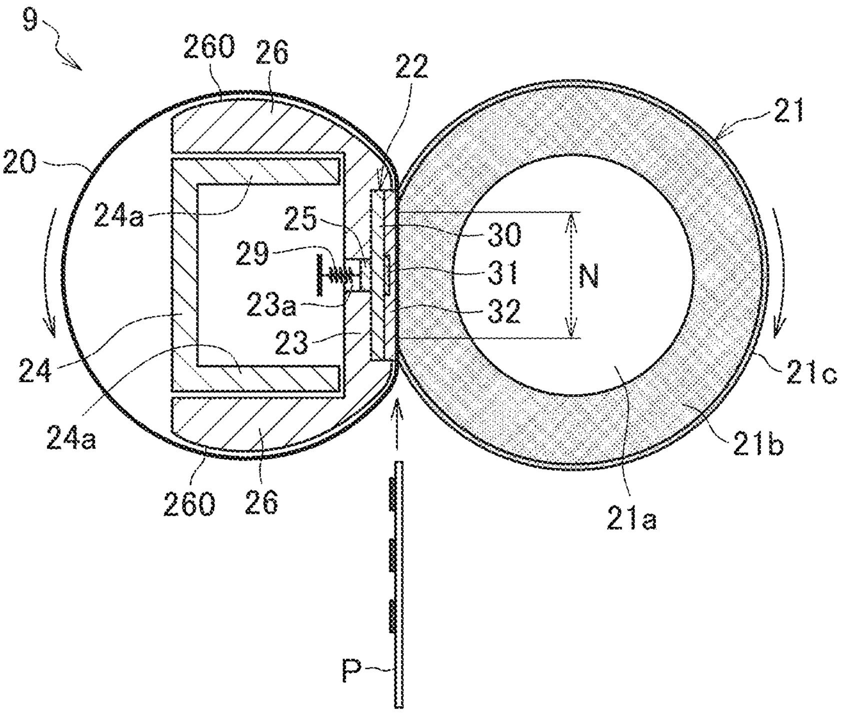
FIG. 2 is a schematic cross-sectional view of a main part of a fixing device incorporated in the image forming apparatus of FIG. 1.

As illustrated in FIG. 2, the fixing device 9 according to the present embodiment includes a fixing belt 20 as a rotator or a fixing member, a pressure roller 21 as an opposed rotator or a pressure rotator, a heater 22 as a heating member, a heater holder 23 as a holder, a stay 24 as a support, a thermistor 25 as a temperature sensor, and a thermostat. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the back side of a base 30. The fixing belt 20, the pressure roller 21, the heater 22, the heater holder 23, and the stay 24 extend in a direction perpendicular to the sheet surface of FIG. 2. Hereinafter, the direction is simply referred to as a longitudinal direction. Note that the longitudinal direction is also a width direction of the sheet P conveyed, a belt width direction of the fixing belt 20, and an axial direction of the pressure roller 21.

The fixing belt 20 includes, for example, a tubular base made of polyimide, and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 to 50 μm to enhance durability of the fixing belt 20 and facilitate separation of the sheet P and a foreign substance from the fixing belt 20. An elastic layer made of rubber having a thickness of from 50 to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 includes a core 21*a*, an elastic layer 21*b*, and a release layer 21*c*. The core 21*a* is a solid core made of iron. The outer diameter of the iron core 21*a* is, for example, 25 mm. The elastic layer 21*b* coats the circumferential surface of the core 21*a*. The elastic layer 21*b* is made of silicone rubber and has a thickness of 3.5 mm, for example. The release layer 21*c* coats an outer circumferential surface of the elastic layer 21*b*. Preferably, the release layer 21*c* is a fluororesin layer having, for example, a thickness of approximately 40 μm to improve releasability of the pressure roller 21.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21. As the pressure roller 21 rotates in a direction indicated by arrow in FIG. 2, the rotation of the pressure roller 21 drives the fixing belt 20 to rotate in a direction indicated by arrow in FIG. 2 due to frictional force therebetween.

The heater 22 is a planar heater extending in the width direction of the fixing belt 20. The heater 22 includes a planar base 30, resistive heat generators 31 disposed on the base 30, and an insulation layer 32 covering the resistive heat generators 31. The insulation layer 32 of the heater 22 contacts the inner circumferential surface of the fixing belt 20, and the heat generated from the resistive heat generators 31 is transmitted to the fixing belt 20 through the insulation layer 32. Although the resistive heat generators 31 and the insulation layer 32 is disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with a material having a high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside a loop of the fixing belt 20. The stay 24 is configured by a channeled metallic member, and both side plates of the fixing device 9 support both end portions of the stay 24. Since the stay 24 supports the heater holder 23 and the heater 22, the heater 22 can receive a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP), reduces heat transfer from the heater 22 to the heater holder 23. Thus, the heater 22 can effectively heat the fixing belt 20.

In addition, the heater holder 23 includes guides 26 configured to guide the fixing belt 20. The guides 26 include upstream guides upstream from the heater 22 (that is under the heater 22 in FIG. 2) and downstream guides downstream from the heater 22 (that is over the heater 22 in FIG. 2) in a belt rotation direction. The upstream guides and the downstream guides of the guides 26 are disposed at intervals in a longitudinal direction of the heater 22. Each guide 26 has a substantial fan shape and has a belt facing surface 260. The belt facing surface 260 faces the inner circumferential surface of the fixing belt 20 and is an arc-shaped or convex curved surface extending in a belt circumferential direction.

The heater holder 23 has a plurality of openings 23*a* arranged in the longitudinal direction. The openings 23*a* extend through the heater holder 23 in the thickness direction thereof. The thermistor 25 and a thermostat which is described later are disposed in the openings 23*a*. The spring 29 presses the thermistor 25 and the thermostat against the back surface of the base 30.

When printing starts in the fixing device 9 according to the present embodiment, the pressure roller 21 is driven to rotate, and the fixing belt 20 starts to be rotated. The belt facing surface 260 of the guide 26 contacts and guides the inner circumferential surface of the fixing belt 20 to stably and smoothly rotates the fixing belt 20. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21, and the unfixed toner image is heated and pressed to be fixed to the sheet P. The fixing belt 20 is a heated member heated by the heater 22. The sheet P is an object to be heated in the fixing nip N.

Figure 3:
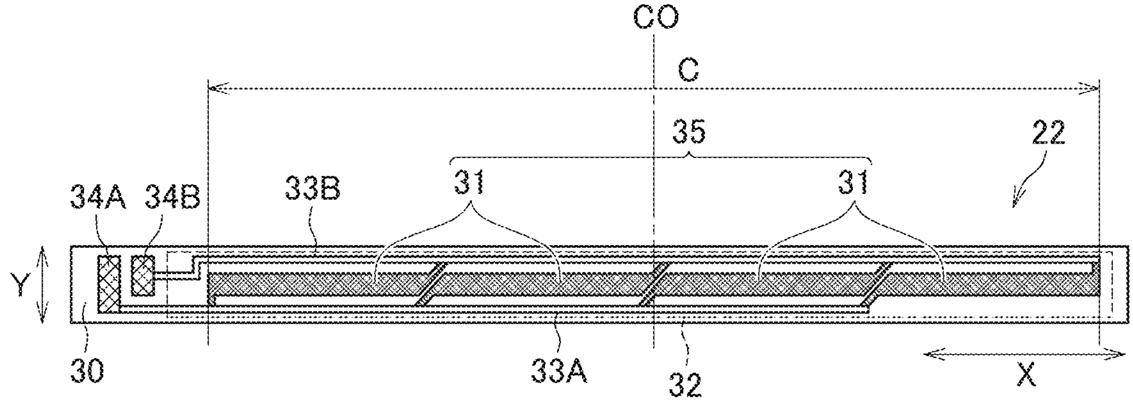
FIG. 3 is a plan view of a heater.

FIG. 3 is a plan view of the heater according to the present embodiment.

As illustrated in FIG. 3, the heater 22 includes a plurality of resistive heat generators 31 (four resistive heat generators 31), power supply lines 33A and 33B that are conductors, a first electrode 34A, and a second electrode 34B that are disposed on the surface of the planar base 30. However, the number of resistive heat generators 31 is not limited to four in the present embodiment.

The heater 22 in the present embodiment includes the plurality of resistive heat generators 31 arranged in the longitudinal direction and separated from each other. The resistive heat generators 31 are electrically coupled in parallel. In the present embodiment, the longitudinal direction of the heater 22 and the like (that is the direction perpendicular to the surface of the paper on which FIG. 2 is drawn) is also an arrangement direction X in which the plurality of resistive heat generators 31 are arranged as described above. Hereinafter, the arrangement direction X of the plurality of resistive heat generators 31 is simply referred to as the arrangement direction. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 3. In the present embodiment, the arrangement direction is same as the longitudinal direction, and the direction intersecting the arrangement direction is also referred to as a longitudinal intersecting direction. The direction Y intersecting the arrangement direction is a direction along the surface of the base 30 on which the resistive heat generators 31 are arranged and is also a short-side direction of the heater 22 and a conveyance direction of the sheet P passing through the fixing device 9.

The plurality of resistive heat generators 31 configure a plurality of heat generation portions 35 divided in the arrangement direction. The resistive heat generators 31 are electrically coupled in parallel to a pair of electrodes 34A and 34B disposed on one end of the base 30 in the arrangement direction (that is a left end of the base 30 in FIG. 3) via the power supply lines 33A and 33B. The power supply lines 33A and 33B are made of conductors having an electrical resistance value smaller than the electrical resistance value of the resistive heat generators 31. A gap area between neighboring resistive heat generators 31 is preferably 0.2 mm or more, more preferably 0.4 mm or more from the viewpoint of maintaining the insulation between the neighboring resistive heat generators 31. However, if the gap area between the neighboring resistive heat generators 31 is too large, the gap area is likely to cause temperature decrease in the gap area. Accordingly, from the viewpoint of reducing the temperature unevenness in the arrangement direction, the gap area is preferably equal to or shorter than 5 mm, and more preferably equal to or shorter than 1 mm.

Figure 7:
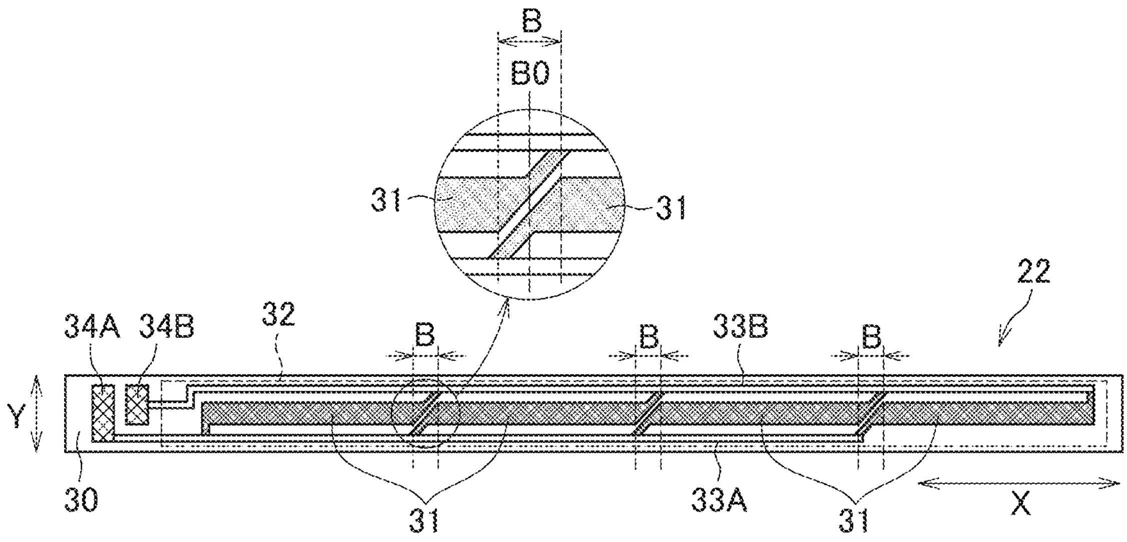
FIG. 7 is a plan view of the heater of FIG. 3 to illustrate a separation area defined by neighboring resistive heat generators.

A main heat generation area of the heater 22 is an area in which the resistive heat generators 31 are arranged in the arrangement direction in the heater 22. Hereinafter, this area is referred to as a heat generation area C of the heater 22. The heat generation area C includes the gap area between the resistive heat generators 31, as illustrated in FIG. 7. A straight line C0 in FIG. 3 indicates the center position of the heat generation area C.

The resistive heat generator 31 is made of a material having a positive temperature coefficient (PTC) of resistance that is a characteristic that the resistance value increases (the heater output decreases) as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the increase in resistance values of the resistive heat generators 31 caused by the temperature increase in the regions outside the width of the small sheets relatively reduces outputs (heat generation amounts) of the resistive heat generators 31 in the regions, thus restraining an increase in temperature in the regions that are end portions of the fixing belt outside the small sheets. Electrically coupling the plurality of resistive heat generators 31 in parallel can restrain temperature rises in non-sheet passing portions while maintaining the print speed. The heat generator that configures the heat generation portion 35 may not be the resistive heat generator having the PTC characteristic. The resistive heat generators may be arranged in a plurality of rows arranged in the direction intersecting the arrangement direction in the heaters 22.

The resistive heat generator 31 is produced by, for example, mixing silver-palladium (AgPd), glass powder, and the like into a paste. The paste is coated on the base 30 by screen printing or the like. Thereafter, the base 30 is fired to form the resistive heat generator 31. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag), silver palladium (AgPd) or the like may be used as a material of the power supply lines 33 and the electrodes 34. Screen-printing such a material forms the power supply lines 33 and the electrodes 34. The power supply lines 33 are made of conductors having an electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment uses an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers, insulates, and protects the resistive heat generators 31 and the power supply lines 33, and additionally retains slidability with the fixing belt 20.

Figure 4:
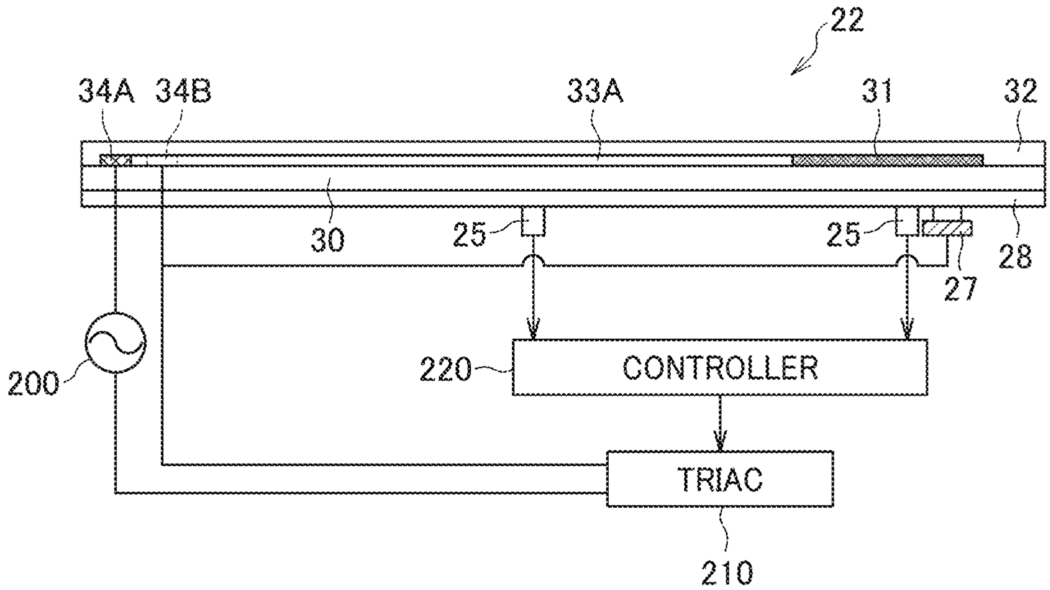
FIG. 4 is a schematic diagram illustrating a circuit to supply power to the heater of FIG. 3.

FIG. 4 is a schematic diagram illustrating a circuit to supply power to the heater according to the present embodiment.

As illustrated in FIG. 4, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls the amount of power supplied. The controller 220 controls an amount of power supplied to the resistive heat generators 31 via a triac 210 based on temperatures detected by the thermistors 25. A controller 220 is configured by a microcomputer including a central processing unit (CPU), a read only memory (ROM), a random access memory (RAM), an input and output (I/O) interface, and the like.

In the present embodiment, one thermistor 25 is disposed in the central region in the arrangement direction of the heaters 22 that is the region inside a sheet conveyance span for the smallest sheet, and the other thermistor 25 is disposed in one end portion of the heater 22 in the arrangement direction. The thermostat 27 as a power cut-off device is disposed in the one end portion of the heater 22 in the arrangement direction and cuts off power supply to the resistive heat generators 31 when the temperature of the resistive heat generator 31 becomes a predetermined temperature or higher. The thermistor 25 and the thermostat 27 are in contact with the back surface of the base 30 to detect the temperature of the base 30.

Figure 5:
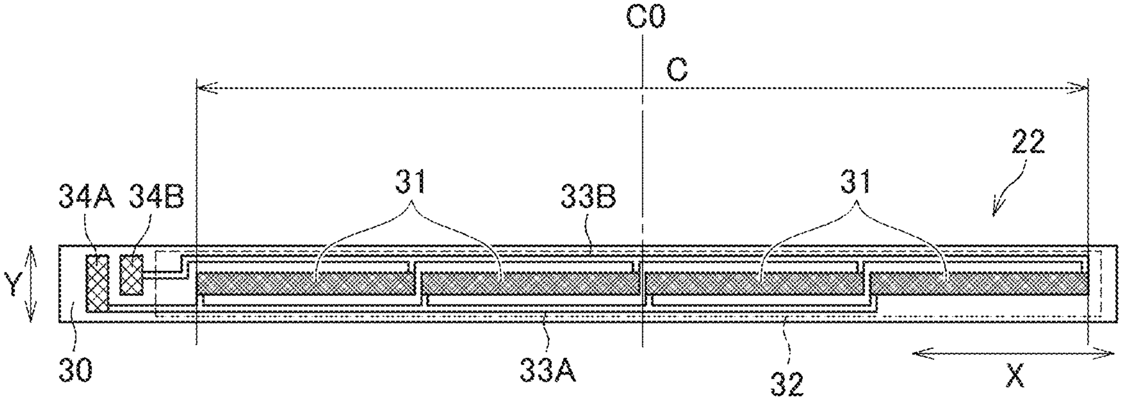
FIG. 5 is a plan view of a heater including resistive heat generators each having a form different from the form of the resistive heat generator illustrated in FIG. 3.
Figure 6:
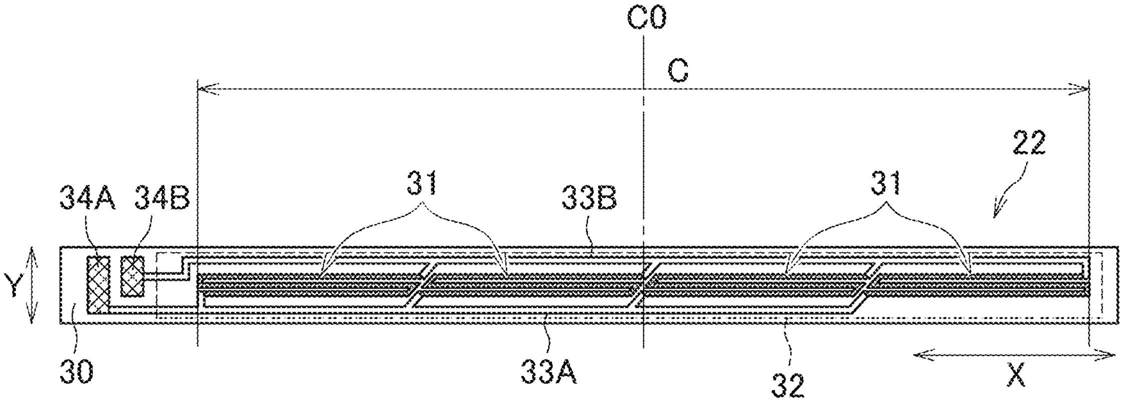
FIG. 6 is a plan view of a heater including resistive heat generators each having a form different from each of the forms of the resistive heat generators illustrated in FIGS. 3 and 5.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 5, the shape of resistive heat generator 31 may be a rectangular shape, or as illustrated in FIG. 6, the resistive heat generator 31 may be configured by meandering line-shaped resistive heat generators. In FIG. 6, for example, the line-shaped resistive heat generator is folded back to form a substantially parallelogram-shaped resistive heat generator 31. In addition, as illustrated in FIG. 5, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

The plurality of resistive heat generators 31 arranged in the longitudinal direction and separated from each other as illustrated in FIG. 7 can prevent overheating a non-sheet passing portion of the heater 22 and a non-sheet passing portion of the fixing belt 20. However, in a separation area B defined by neighboring resistive heat generators as illustrated in an enlarged partial plan view of FIG. 7, an area occupied by the resistive heat generators 31 is smaller than an area occupied by the resistive heat generators 31 in a heat generation area other than the separation area B. Therefore, the amount of heat generated by the heater 22 in the separation area B is smaller than the amount of heat generated by the heater 22 in the heat generation area other than the separation area B. With reference to the enlarged partial plan view of FIG. 7, the separation area B is defined as an area in the arrangement direction including the entire gap area between the resistive heat generators 31 that are the main heat generation parts of the heater 22. A straight line B0 in FIG. 7 indicates the center position of the separation area B.

Figure 8:
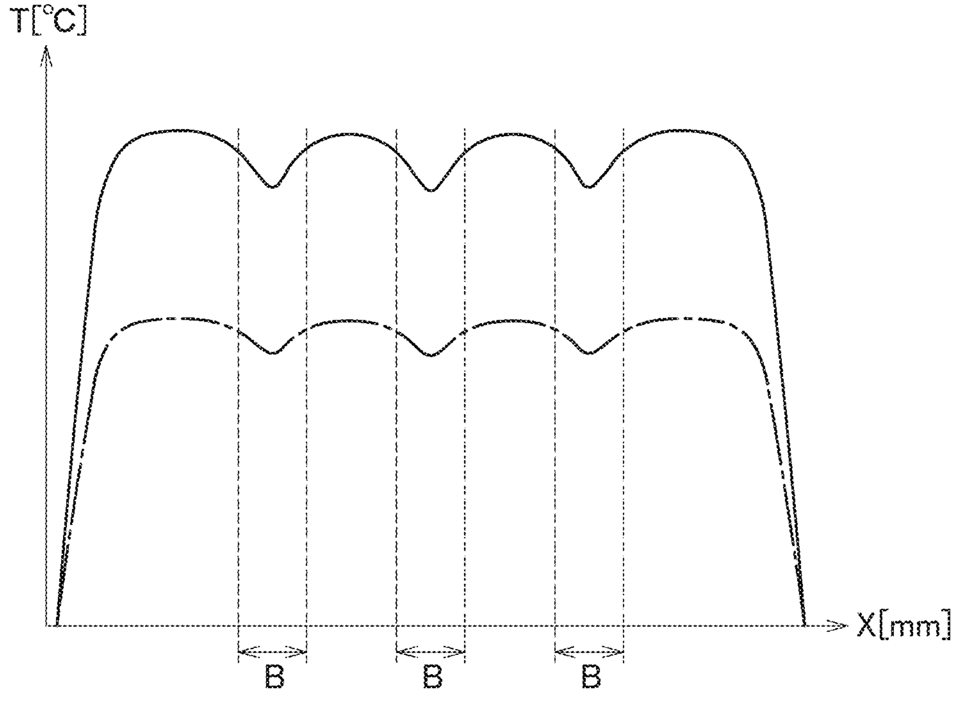
FIG. 8 is a graph illustrating a temperature distribution of a fixing belt and a temperature distribution of a pressure roller in an arrangement direction in which the resistive heat generators are arranged.

FIG. 8 is a graph illustrating a temperature distribution of the fixing belt 20 and a temperature distribution of the pressure roller 21 in the arrangement direction that are heated by the heater 22. The horizontal axis represents the position X in the arrangement direction, and the vertical axis represents the temperature T. The solid line in the graph indicates the temperature distribution of the fixing belt 20, and the alternate long and short dash line in the graph indicates the temperature distribution of the pressure roller 21.

As illustrated in FIG. 8, the temperatures of the fixing belt 20 and the pressure roller 21 are low at positions corresponding to the separation areas B in the arrangement direction and in the vicinity of the positions, and temperature unevenness in the arrangement direction occurs.

Figure 9:
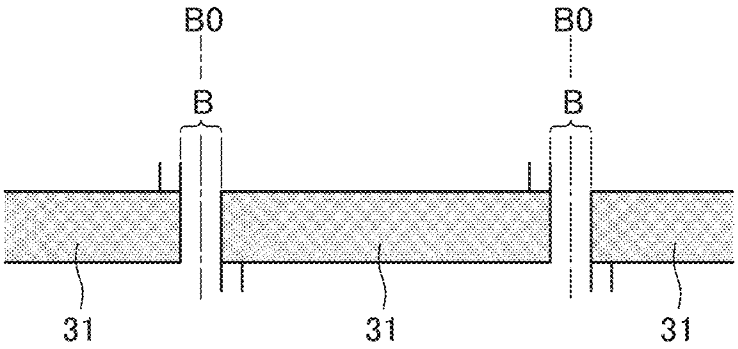
FIG. 9 is a top view of the separation areas of the heater of FIG. 5.
Figure 10:
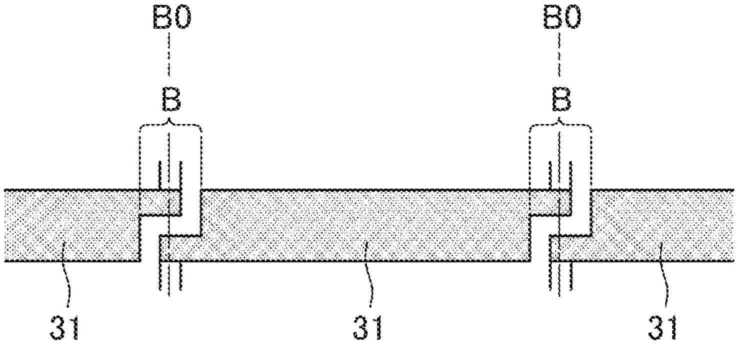
FIG. 10 is a top view of the separation areas each of which is between resistive heat generators having a different shape from the shapes of the resistive heat generators illustrated in FIGS. 3, 5, and 6.
Figure 11:
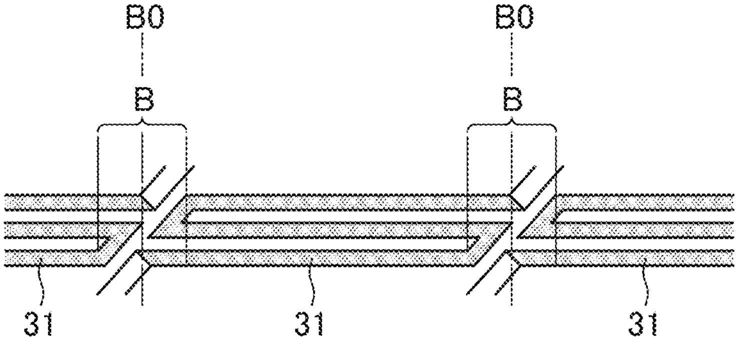
FIG. 11 is a top view of the separation areas of the heater of FIG. 6.

As illustrated in FIG. 9, the heater 22 including the rectangular resistive heat generators 31 illustrated in FIG. 5 also has the separation areas B with lower temperatures than the other areas. In addition, the heater 22 including the resistive heat generators 31 having forms as illustrated in FIG. 10 has the separation areas B with lower temperatures than the other areas. As illustrated in FIG. 11, the heater 22 including the resistive heat generators 31 having forms as illustrated in FIG. 6 has the separation areas B with lower temperatures than the other areas. However, overlapping the resistive heat generators 31 lying next to each other in the arrangement direction as illustrated in FIGS. 7, 10, and 11 can reduce the above-described temperature drop that the temperature of heater 22 in the separation area B is smaller than the temperature of heater 22 in the area other than the separation area B.

Figure 12:
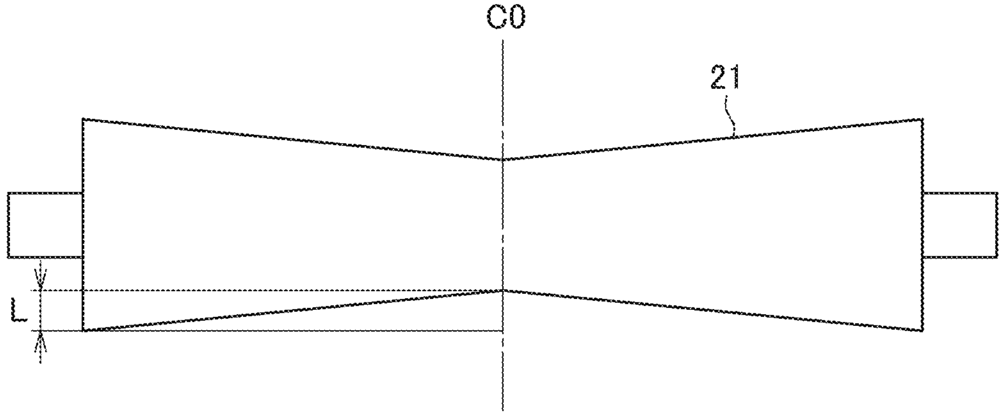
FIG. 12 is a plan view of a pressure roller according to a comparative embodiment.

The following describes a disadvantage caused by the temperature unevenness in the pressure roller 21 having a shape illustrated in FIG. 12 according to a comparative embodiment.

The pressure roller 21 illustrated in FIG. 12 has an inverted-crown shape in which the outer diameter gradually increases from a boundary corresponding to the center position C0 of the heat generation area C toward ends corresponding to both ends of the heat generation area C. Hereinafter, a difference L between the outer diameter of the pressure roller 21 at the end in the arrangement direction and the outer diameter of the pressure roller 21 at the position corresponding to the center position C0 of the heat generation area C is referred to as a crown amount L. In addition, a portion of the pressure roller 21 facing the center position C0 is referred to as "an inside" of the pressure roller 21, and an end of the pressure roller 21 is referred to as "an outside" of the pressure roller 21.

The pressure roller 21 having the shape as illustrated in FIG. 12 has the outer diameter increasing from the center to ends of the pressure roller 21. The larger the outer diameter of the pressure roller 21, the larger the force the pressure roller 21 exerts on the sheet P. The larger force is applied to sides of the sheet P in the width direction of the sheet P than to the center of the sheet P. The above-described configuration can apply a force toward the outer end of the sheet P in the width direction (that is the arrangement direction) to the sheet P passing through the fixing nip, which prevents the occurrence of wrinkles in the sheet conveyed through the fixing nip.

However, the above-described temperature unevenness of the pressure roller 21 in the arrangement direction changes the amount of thermal expansion of the pressure roller 21 in the arrangement direction, and thus the effect of reducing wrinkles in the sheet cannot be appropriately obtained. The following describes a relationship between the thermal expansion amount of the pressure roller 21 and the effect of reducing the wrinkles in the sheet.

Figure 13:
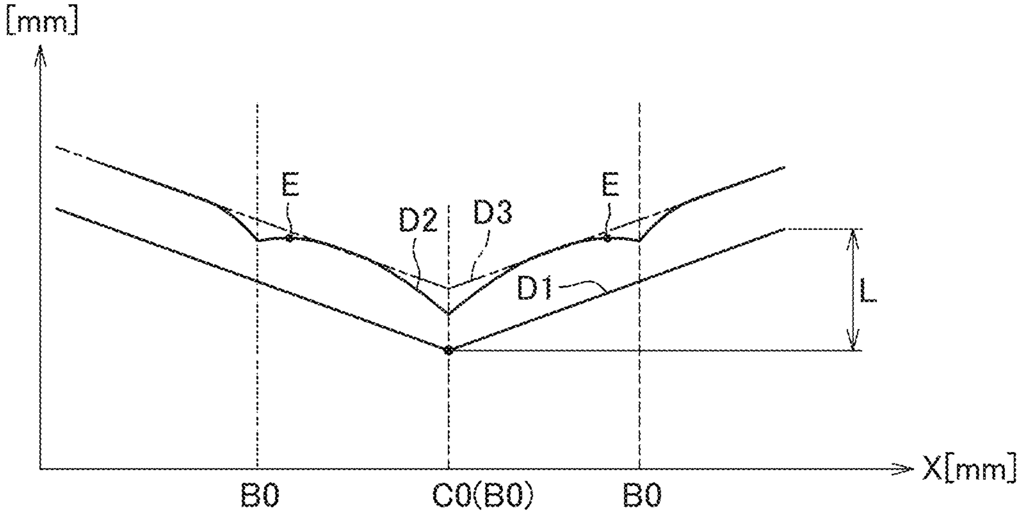
FIG. 13 is a graph illustrating outer diameter profiles of the pressure roller in the arrangement direction before and after thermal expansion of the pressure roller.

FIG. 13 is a graph illustrating an outer diameter profile of the pressure roller 21 in the arrangement direction after the thermal expansion of the pressure roller 21. The horizontal axis represents the position in the arrangement direction, and the vertical axis represents the outer diameter of the pressure roller 21. A line D1 illustrated on the lower part of the graph is an outer diameter profile of the pressure roller 21 in the arrangement direction before the thermal expansion of the pressure roller 21 (that is, in a cold state), in other words, a line formed by continuously plotting the outer diameters in the arrangement direction. A curve D2 illustrated on the upper part of the graph indicates the outer diameter profile of the pressure roller 21 after the thermal expansion of the pressure roller 21, and an alternate long and short dash line D3 indicates the outer diameter profile of the pressure roller 21 that thermally expands by an equal amount at each position in the arrangement direction. FIG. is a graph illustrating an outer diameter profile of the pressure roller 21 according to a first embodiment, which is described below. The above-described definitions are also applied to FIGS. 15 to 17. In FIGS. 13 to 17, the amount of increase in the outer diameter of the pressure roller 21 is exaggerated for the sake of convenience.

The amount of increase in the outer diameter of the pressure roller 21 is an amount by which the outer diameter of the pressure roller 21 increases from the position of the pressure roller 21 corresponding to the center position C0 of the heat generation area C (see FIG. 3) toward the outer end of the pressure roller 21 corresponding to one of the ends of the heat generation area C. The amount of increase in the outer diameter can be obtained as a difference in the outer diameters in a certain section on the pressure roller 21 in the arrangement direction. Alternatively, the amount of increase in the outer diameter may be evaluated by the inclination at each position on each of the lines D1 to D3 in the arrangement direction as the absolute value of the outer diameter increase amount at the position. Hereinafter, the thermal expansion at the outer diameter of the pressure roller is evaluated by an increasing rate of the outer diameter. The increasing rate of the outer diameter is an increase amount of the outer diameter of the pressure roller per unit length in a direction from the center toward the end of the pressure roller. The increasing rate of the outer diameter means the inclination at each of positions of lines and curves in the graphs of FIGS. 15, 16, and 17.

As illustrated in FIG. 8, temperature of the pressure roller 21 is low at a position facing the center position B0 of the separation area B and in the vicinity of the position in the arrangement direction. Therefore, as illustrated in FIG. 13, the low temperature reduces the amount of thermal expansion of the pressure roller 21 and the increasing rate of the outer diameter at each position of the position facing the center position B0 and in the vicinity of the position. In other words, the low temperature increases the difference between the value of the solid line D2 and the value of the alternate long and short dash line D3 at the position in the above-described range in FIG. 13. As a result, the pressure roller 21 has concave portions facing the center positions B0 of the separation areas as indicated by the solid line D2 and does not have a shape in which the outer diameter of the pressure roller 21 gradually increases toward the outside.

The above-described difference in the thermal expansion amounts of the pressure roller 21 generates a difference in the forces applied to the sheet P by the pressure roller 21 at positions in the arrangement direction. The difference in the forces causes wrinkles in the sheet P conveyed through the fixing nip N. In particular, the difference in the forces applied to the sheet P is large at the local maximum point E illustrated in FIG. 13, which causes the wrinkles in the sheet P.

In FIG. 13, the local maximum point E is a point at which the inclination of the solid line D2 is inverted (that is, the point at which the inclination of the solid line D2 changes from an inclination in which the outer diameter increases toward the outside to an inclination in which the outer diameter decreases toward the outside). In the pressure roller 21 having the outer diameter profile as illustrated by the solid line D1 in FIG. 13, the force applied to the sheet P increases toward the outside, and the force is uniformly applied to the sheet in a direction in which the force stretches the sheet P, that is, the direction toward the outside in the arrangement direction. In contrast, the pressure roller 21 having the outer diameter profile as illustrated by the solid line D2 in FIG. 13 has a range in which the outer diameter decreases toward the outside, that is, the range from the position of the pressure roller 21 facing the center position B0 of the separation area toward the center of the pressure roller 21. In the other range, the outer diameter increases toward the outside. In the above-described range contrary to the other range, the force applied to the sheet P decreases toward the outside. As a result, in the other range of the pressure roller 21 from the local maximum point E to the center of the pressure roller, the force toward the outside is applied to the sheet P and stretches the sheet P. In the range of the pressure roller 21 from the local maximum point E to the outside, the force toward the inside is applied to the sheet P and contracts the sheet P. In other words, the sheet P receives the forces in two opposite directions (the stretching direction and the contracting direction) at the local maximum point E, and wrinkles occur in the sheet P.

Figure 14:
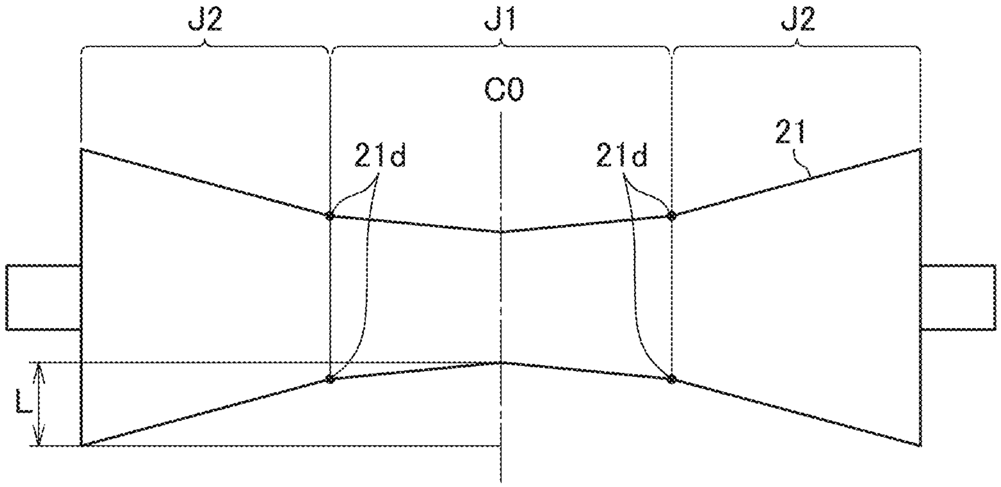
FIG. 14 is a plan view of the pressure roller according to a first embodiment.

Next, a description is given of the pressure roller 21 of a first embodiment. As illustrated in FIG. 14, the pressure roller 21 of the first embodiment has a first region J1 and second regions J2 arranged in the arrangement direction. The first region J1 is the inside of the pressure roller 21 in the arrangement direction, and each of the second regions J2 is the outside of the pressure roller 21 in the arrangement direction. That is, the first region J1 of the pressure roller 21 is nearer to a position on the pressure roller 21 facing the center position C0 of the heat generation area C of the heater 22 than the second region J2 of the pressure roller 21. The increasing rate of the outer diameter in the first region J1 is relatively smaller than the increasing rate of the outer diameter in the second region J2. The increasing rate of the outer diameter in the arrangement direction is constant in each of the first region J1 and the second region J2. In other words, the pressure roller 21 has an inflection point 21*d* on the surface of the pressure roller 21. The inflection point 21*d* is at a position in the arrangement direction and serves as a boundary. The increasing rate of the outer diameter in a region from the inflection point 21*d* toward the outside is larger than the increasing rate of the outer diameter in a region from the inflection point 21*d* toward the inside.

The pressure roller 21 according to the first embodiment has the inflection point 21*d* at the position in a range from the local maximum point E toward the inside. In other words, the inflection point 21*d* is located at the position in the range from the position at which the increasing rate of the outer diameter is inverted toward the inside. The position occurs after the pressure roller 21 that has a constant increasing rate of the outer diameter under the room temperature as illustrated in FIG. 12 thermally expands.

Figure 15:
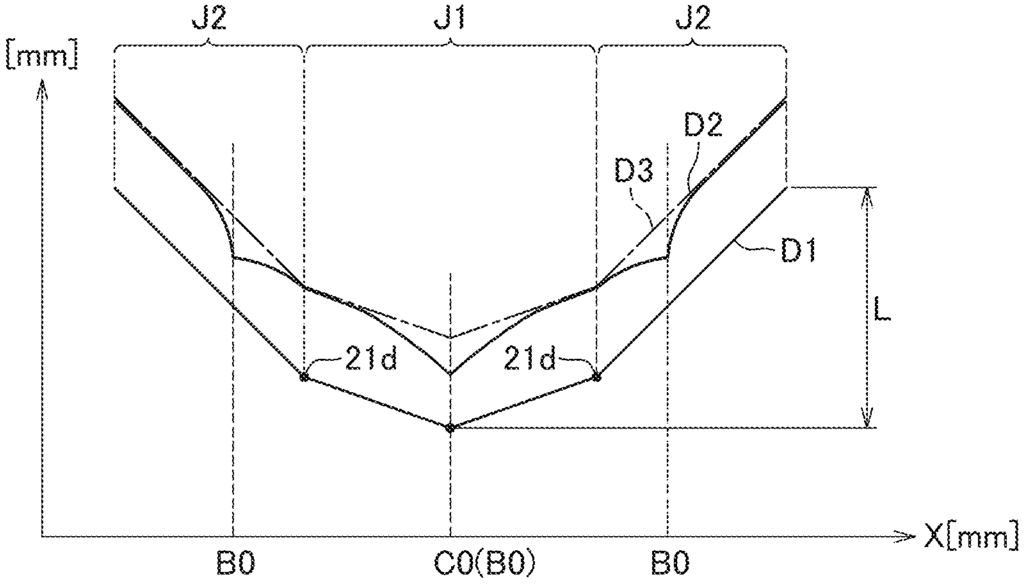
FIG. 15 is a graph illustrating outer diameter profiles of the pressure roller of FIG. 14 in the arrangement direction before and after thermal expansion of the pressure roller.

As described above, the thermal expansion changes the increasing rate of the outer diameter of the pressure roller 21 illustrated in FIG. 12 to be negative in a region from the position facing the center position B0 of the separation area toward the inside. In contrast, the pressure roller 21 in the first embodiment is designed so that the increasing rate of the outer diameter in the region from the position facing the center position B0 of the separation area toward the inside (specifically, the region from the position facing the center position B0 of the separation area toward the inside and the region outside the region J1) is relatively larger than the increasing rate of the outer diameter in the region J1. Designing the pressure roller 21 so that the increasing rate of the outer diameter in the region from the position facing the center position B0 of the separation area toward the inside to be larger than the increasing rate of the outer diameter in the region J1 considering a difference between thermal expansions in the above-described regions in advance prevents the increasing rate of the outer diameter in the region from the position facing the center position B0 of the separation area toward the inside from being smaller than the increasing rate of the outer diameter in the region J1. As a result, the occurrence of the wrinkles in the sheet is prevented. Specifically, as illustrated in FIG. 15, the above-described configuration prevents the occurrence of the local maximum point E in the range of the pressure roller 21 from the inflection point 21*d* to the position facing the center position B0 of the separation area. As a result, the above-described configuration reduces the inward force acting on the sheet P and prevents the occurrence of wrinkles in the sheet P.

The occurrence of wrinkles in the sheet P is prevented by setting the increasing rate of the outer diameter of the pressure roller 21 in the region facing a part of the separation area and the region from the position facing the center position B0 of the separation area defined by neighboring resistive heat generators toward the inside, to be relatively larger than the increasing rate of the outer diameter in the region from the above-described region toward the inside. The above-described center position B0 of the separation area defined by neighboring resistive heat generators is not the center position C0 of the heat generation area. The center position B0 is outside the center position C0. The heater 22 in the present embodiment has two center positions B0 of the separation areas.

The occurrence of wrinkles in the sheet P is prevented by setting the increasing rate of the outer diameter of the pressure roller 21 in at least a part of the region of 30 mm from the position facing the center position B0 of the separation area defined by neighboring resistive heat generators toward a position facing the center position C0 of the heat generation area to be relatively larger than the increasing rate of the outer diameter of the pressure roller 21 in the region of 20 mm from the position facing the center position C0 of the heat generation area toward the outside.

Preferably, the occurrence of wrinkles in the sheet P is prevented by setting the increasing rate of the outer diameter of the pressure roller 21 in at least a part of the range of 10 mm from the position facing the center position B0 of the separation area defined by neighboring resistive heat generators toward the position facing the center position C0 of the heat generation area to be relatively larger than the increasing rate of the outer diameter of the pressure roller 21 in the range of 20 mm from the position facing the center position C0 of the heat generation area toward the outside.

Preferably, the pressure roller 21 is designed to have the inflection point 21*d* in a range of 30 mm from the position facing the center position B0 of the separation area defined by neighboring resistive heat generators toward the outside. Setting the inflection point 21*d* too close to the center of pressure roller 21 increases the second region J2, and the crown amount L becomes too large. As a result, the force applied to the sheet P becomes excessive, which causes unstable behavior of the sheet P passing through the fixing nip N. This causes the toner image on the surface of the sheet P to come into contact with other members, which results in the occurrence of abnormal image. Setting the inflection point 21*d* as described above can reduce the force applied to the sheet P.

Figure 16:
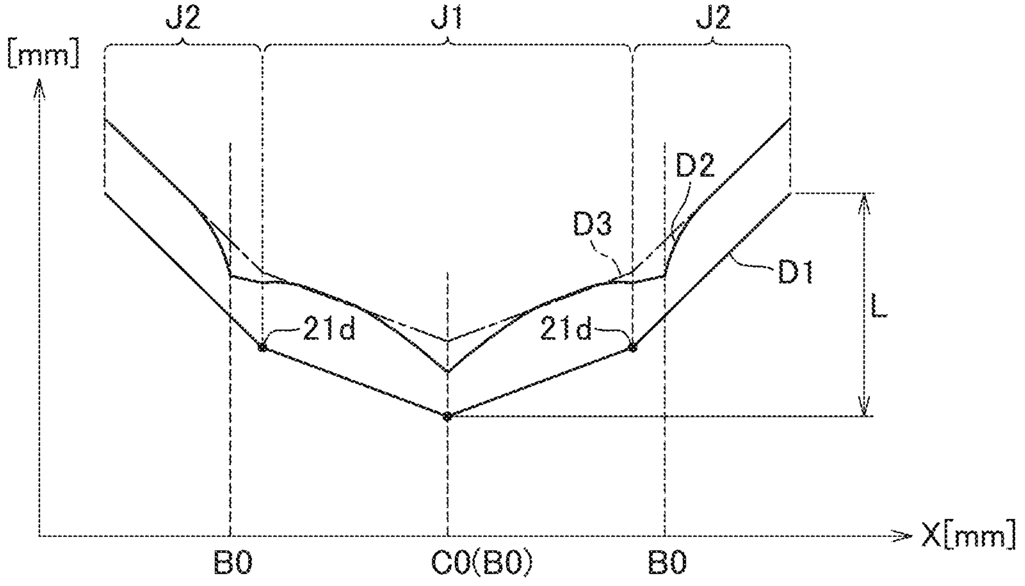
FIG. 16 is a graph illustrating outer diameter profiles of the pressure roller according to a second embodiment in the arrangement direction before and after thermal expansion of the pressure roller.

The position of the inflection point 21*d* is not limited to the arrangement illustrated in FIG. 15. However, it is preferable that the inflection point 21*d* is designed to be at a position inside a position at which the local maximum point E may occur. For example, in a second embodiment illustrated in FIG. 16, the inflection point 21*d* in FIG. 16 is outside the inflection point in FIG. 15 and disposed at a position corresponding to the local maximum point E illustrated in FIG. 13. The above-described configuration according to the second embodiment can obtain the effect of preventing the occurrence of wrinkles in the sheet as described above and reduce the second region to reduce the crown amount.

Figure 17:
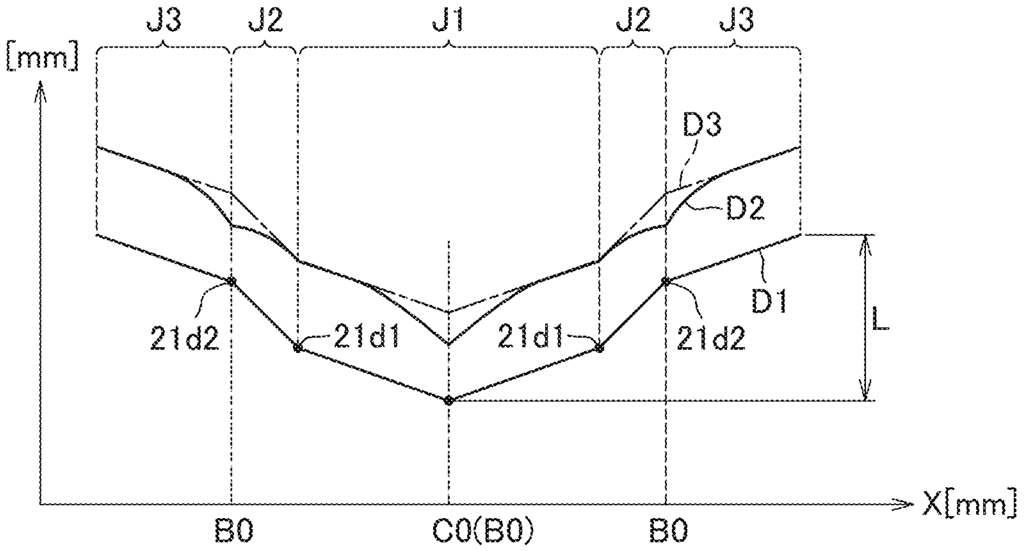
FIG. 17 is a graph illustrating outer diameter profiles of the pressure roller according to a third embodiment in the arrangement direction before and after thermal expansion of the pressure roller.

In a third embodiment, the pressure roller 21 as illustrated in FIG. 17 has second first regions J3 outside the second regions J2. In other words, the pressure roller 21 has other inflection points 21*d*2 in addition to the inflection points 21*d*1, and the other inflection points 21*d*2 are outside the inflection points 21*d*1. The pressure roller 21 has the second first regions J3 outside the other inflection points 21*d*2. In the pressure roller 21 of the third embodiment, the increasing rate of the outer diameter increases in the second regions J2 outside the first region J1 and decrease in the second first regions J3 outside the second regions J2 like the first region J1.

The second region J2 that is an entire region outside the inflection point 21*d* as illustrated in FIGS. 15 and 16 can prevent the occurrence of wrinkles in the sheet but increases the crown amount L. To reduce the crown amount, the second region J2 in the third embodiment is set to be a region of the pressure roller from the position facing the center position B0 of the separation area toward the center of the pressure roller and the region at which the above-described local maximum point E may occur. The first regions J3 are set outside the second regions J2. The second region J2 in the third embodiment is narrower than the second region J2 in the first and second embodiments described above. The above-described configuration can prevent the occurrence of wrinkles in the sheet and reduce the crown amount L to be as small as possible. Note that setting the first region J3 to be at least a part of the region outside the position facing the center position B0 of the separation area can reduce the crown amount L.

The above-described configurations of the pressure roller 21 are preferably applied to the fixing device having a configuration in which the base of the fixing belt 20 is made of resin such as polyimide as in the present embodiments. The fixing belt 20 has a small thermal conductivity and is hard to transfer heat in the arrangement direction. Accordingly, the temperature drop in the separation area B defined by neighboring resistive heat generators 31 is likely to cause the temperature unevenness in the fixing belt 20 and the pressure roller 21 in the arrangement direction. As a result, the difference in the thermal expansion amounts of the pressure roller 21 is likely to occur. Therefore, applying the configurations of the pressure roller 21 of the present embodiments to the above-described fixing device is preferable.

The above-described configurations of the pressure roller 21 are preferably applied to the fixing device in which the base 30 of the heater 22 has a small thermal conductivity. The base 30 having the small thermal conductivity is hard to transfer heat in the arrangement direction. Accordingly, the temperature drop in the separation area B defined by neighboring resistive heat generators 31 is likely to cause the temperature unevenness in the pressure roller 21 in the arrangement direction. As a result, the difference in the thermal expansion amounts of the pressure roller 21 is likely to occur. Therefore, applying the configurations of the pressure roller 21 of the present embodiments to the above-described fixing device is preferable. Specifically, applying the configurations of the pressure roller 21 of the present embodiments to the fixing device including the base 30 having the thermal conductivity equal to or less than 100 W/m·K is preferable.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity is measured using a thermal diffusivity/conductivity measuring device (trade name: ai-Phase Mobile 1u, manufactured by Ai-Phase co., ltd.).

In order to convert the thermal diffusivity into thermal conductivity, values of density and specific heat capacity are necessary.

The density is measured by a dry automatic densitometer (trade name: Accupyc 1330 manufactured by Shimadzu Corporation).

The specific heat capacity is measured by a differential scanning calorimeter (trade name DSC-60 manufactured by Shimadzu Corporation), and sapphire is used as a reference material in which the specific heat capacity is known. In the present embodiment, the specific heat capacity is measured five times, and an average value at 50° C. is used. The thermal conductivity λ is obtained by the following expression (1).

$$\lambda = \rho \times C \times \alpha. \tag{1}$$

where ρ is the density, C is the specific heat capacity, and α is the thermal diffusivity obtained by the thermal diffusivity measurement described above.

As in the present embodiments, the heater not including a thermal equalization plate (that is a high thermal conduction member) made of a member having a high thermal conductivity such as a metal member is likely to cause the temperature unevenness in the pressure roller 21 in the arrangement direction. Accordingly, applying the configurations of the pressure roller 21 of the present embodiments to the fixing device including the above-described heater is preferable. In addition, the temperature unevenness in the fixing belt 20 and the pressure roller 21 in the arrangement direction is more likely to occur in the fixing device including the heater 22 in direct contact with the fixing belt 20 than in the fixing device including the heater in contact with the inner surface of the fixing belt 20 via another member such as the thermal equalization plate or the sliding sheet. Accordingly, applying the configurations of the pressure roller 21 of the present embodiments to the fixing device including the heater 22 in direct contact with the fixing belt 20 is preferable.

The heater 22 in the present embodiment has a thickness of 1.0 mm In the thin heater 22, to be more specific, the heater 22 that is 1.1 mm or less thick, the thermal capacity of the heater 22 is small, and the temperature unevenness in the arrangement direction is likely to occur in the heater 22. That is, the temperature unevenness in the arrangement direction is likely to occur in the fixing belt 20 and the pressure roller 21. As a result, the difference in the thermal expansion amounts of the pressure roller 21 is likely to occur. Therefore, applying the configurations of the pressure roller 21 of the present embodiments to the above-described fixing device is preferable.

Figure 18:
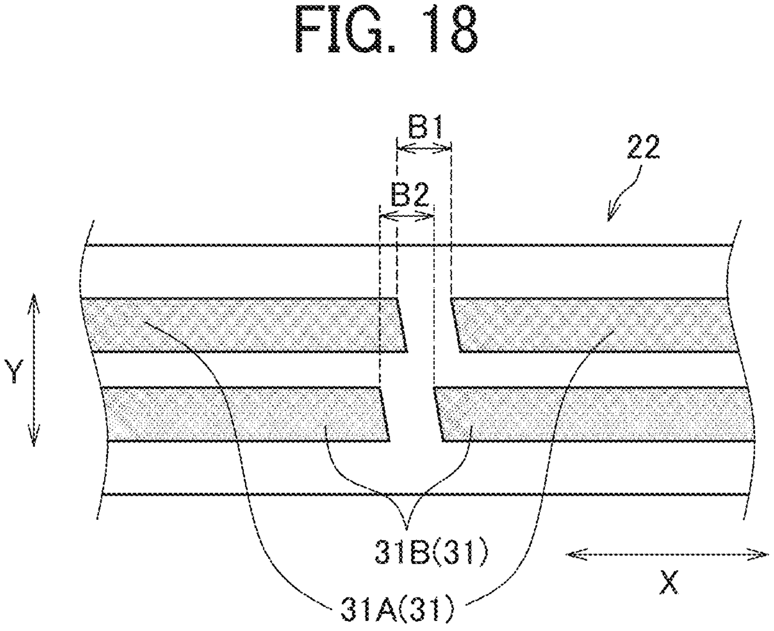
FIG. 18 is a top view of the separation areas of the heater including a plurality of resistive heat generators arranged in a short-side direction of the heater.

The heater 22 illustrated in FIG. 18 includes a plurality of resistive heat generators 31 arranged in the short-side direction of the heater 22. Specifically, the heater 22 includes a first row including a plurality of resistive heat generators 31A and a second row including a plurality of resistive heat generators 31B, and the first row and the second row are arranged in the short-side direction. In the first row and the second row, a plurality of resistive heat generators 31 are arranged in the longitudinal direction. In the heater 22 according to the present embodiment, the arrangement direction in the heaters 22 is the longitudinal direction of the heater 22, and the direction intersecting the arrangement direction is the short-side direction of the heater 22.

The separation area B1 defined by the resistive heat generators 31A in the first row overlaps the separation area B2 defined by the resistive heat generators 31B in the second row in the longitudinal direction. In the heater 22 having the above-described configuration, the temperature of the pressure roller 21 is particularly likely to drop at a position corresponding to each of the separation areas defined by the resistive heat generators. Accordingly, applying the above-described configurations of the pressure roller 21 to the fixing device including the above-described heater 22 is preferable to prevent the occurrence of wrinkles in the sheet.

Figure 19:
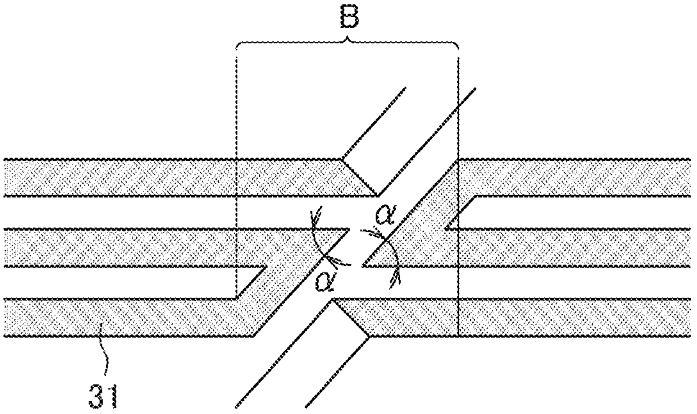
FIG. 19 is a top view of a meandering part of resistive heat generators of the heater of FIG. 6 to illustrate a folding angle.

A large temperature drop in the separation area occurs in the heater 22 illustrated in FIG. 6 that is configured by meandering line-shaped resistive heat generators 31 and has a folded portion having an acute folding angle. That is, the temperature drop is likely to occur at a portion having the acute angle α in a part of the folded portion as illustrated in FIG. 19. Accordingly, applying the above-described configurations of the pressure roller 21 to the fixing device including the above-described heater 22 is preferable to prevent the occurrence of wrinkles in the sheet.

The fixing belt 20 may not easily come into contact with a center portion of the pressure roller 21 described above that has the outer diameter increasing from the center toward outer ends and has the large crown amount L (see FIG. 12).

Figure 20:
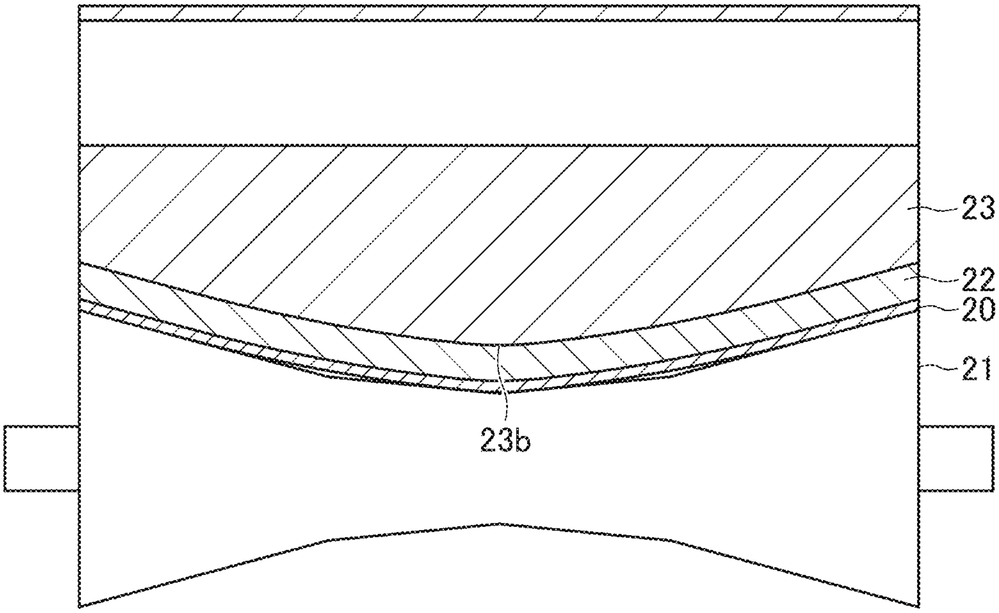
FIG. 20 is a schematic side view of a heater holder having a convex portion.

To solve the above disadvantage, the heater holder 23 in an embodiment has a convex surface **23*b* facing the heater 22 as illustrated in FIG. 20. The surface 23*b* is a bottom face of the C-shaped heater holder 23 and holds the heater 22. In other words, the center portion of the heater holder 23 in the arrangement direction protrudes toward the pressure roller 21 from ends of the heater holder 23 in the arrangement direction. Thus, the center portion of the fixing belt 20 in the arrangement direction protrudes and is in contact with the center portion of the pressure roller 21. The center portion of the surface 23*b* protrudes in an assembled state in which the pressure roller 21 and the fixing belt 20** are not in pressure contact with each other.

Figure 21:
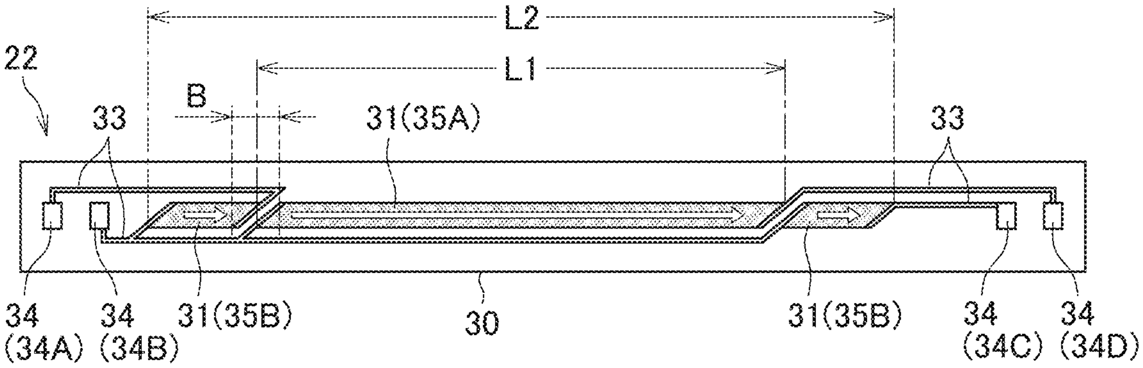
FIG. 21 is a plan view of a heater having a further different configuration.

The heater 22 in an embodiment illustrated in FIG. 21 includes three resistive heat generators 31 arranged along the arrangement direction on the base 30. One of the three resistive heat generators is a central heat generation portion 35A as a first heat generator disposed at the center of the base 30 in the arrangement direction, and the remaining two resistive heat generators are end heat generation portions 35B as second heat generators disposed adjacent to both ends of the central heat generation portion 35A in the arrangement direction. The central heat generation portion 35A and the end heat generation portions 35B are configured to be independently controlled with respect to heat generation.

The plurality of electrodes 34 are referred to as a first electrode 34A, a second electrode 34B, a third electrode 34C, and a fourth electrode 34D in order from the left side in FIG. 21. Applying a voltage to the second electrode 34B and the fourth electrode 34D causes the central heat generation portion 35A to generate heat. Applying a voltage to the first electrode 34A and the second electrode 34B causes the left end heat generation portion 35B in FIG. 21 to generate heat, and applying a voltage to the second electrode 34B and the third electrode 34C causes the right end heat generation portion 35B in FIG. 21 to generate heat.

In addition, the first electrode 34A and the third electrode 34C are coupled in parallel outside the heater 22 and configured to be able to apply the voltage at the same time. Applying the voltage between the second electrode 34B and each of the first electrode 34A and the third electrode 34C enables both end heat generation portions 35B to generate heat at the same time. Each of Arrows in FIG. 21 indicates a direction of current flowing in the arrangement direction of each of the heat generation portions 35A and 35B.

When a width of the sheet passing through the fixing device 9 is equal to or shorter than the width L1 of the central heat generation portion 35A, the central heat generation portion 35A generates heat. When the width of the sheet passing through the fixing device 9 is longer than the width L1 of the central heat generation portion 35A, the end heat generation portions 35B generate heat in addition to the central heat generation portion 35A. The above-described configuration can change a width of the heat generation area in accordance with the width of a sheet passing portion. Additionally, the width L1 of the central heat generation portion 35A is set to a width of a small sheet (for example, a width corresponding to A4 sheet: 215 mm). The width L2 of the heat generation area from one end heat generation portion 35B to the other end heat generation portion 35B is set to a width of a large sheet (for example, a width corresponding to A3 sheet: 301 mm). In the above-described configuration, turning off the end heat generation portions 35B prevents an excessive temperature rise in a non-sheet passing portion caused by many small sheets P passing through the fixing device. The above-described configuration can improve the productivity of printing because the above-described configuration does not need to reduce a print speed to prevent the excessive temperature rise.

The above-described heater 22 also has the separation area B defined by neighboring resistive heat generators 31, which causes the temperature drop of the fixing belt 20 and the pressure roller 21. Accordingly, the pressure roller 21 configured as the above-described embodiments can prevent the occurrence of wrinkles in the sheet.

The above-described embodiments are illustrative and do not limit this disclosure. It is therefore to be understood that within the scope of the appended claims, numerous additional modifications and variations are possible to this disclosure otherwise than as specifically described herein.

Figure 22:
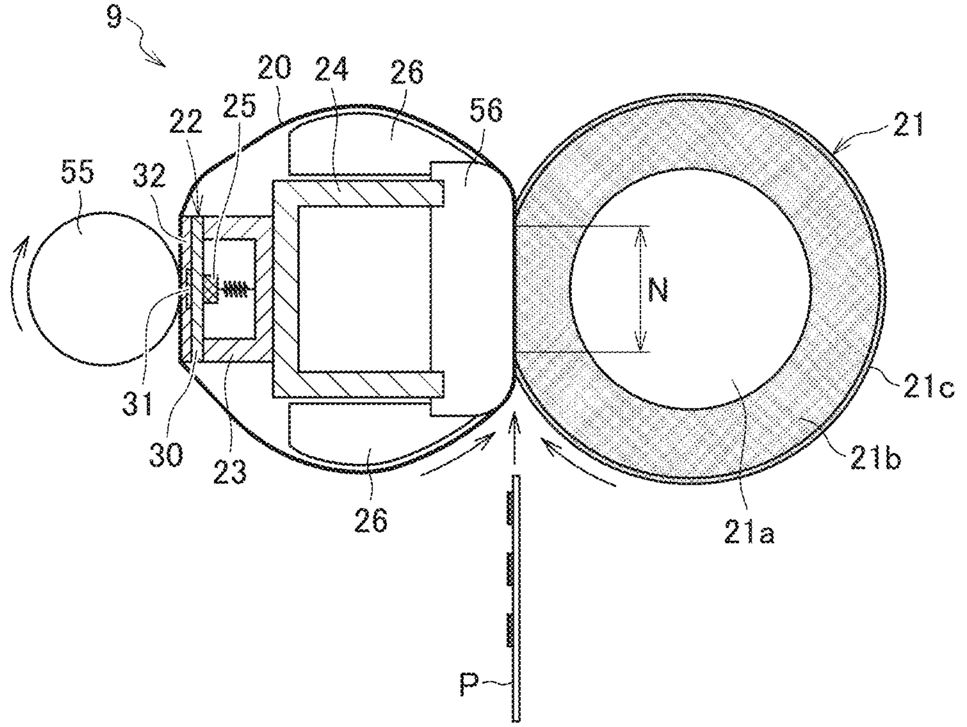
FIG. 22 is a schematic sectional view of a fixing device different from the fixing device of FIG. 2.
Figure 23:
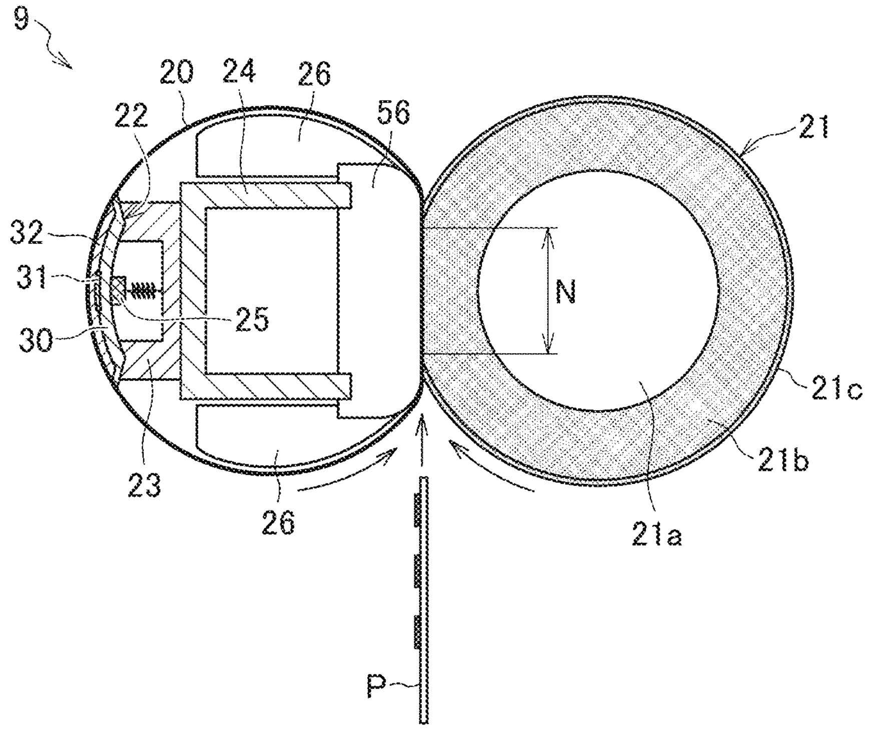
FIG. 23 is a schematic sectional view of a fixing device different from the fixing devices of FIGS. 2 and 22.

The embodiments of the present disclosure are also applicable to fixing devices as illustrated in FIGS. 22 and 23, respectively, other than the fixing device 9 described above. The configurations of fixing devices illustrated in FIGS. 22 and 23 are briefly described below.

First, the fixing device 9 illustrated in FIG. 22 includes a pressurization roller 55 opposite the pressure roller 21 with respect to the fixing belt 20. The pressurization roller 55 is an opposed rotator that rotates and is opposite the fixing belt 20 as the rotator. The fixing belt 20 is sandwiched by the pressurization roller 55 and the heater 22 and heated by the heater 22. On the other hand, a nip formation pad 56 serving as a nip former is disposed inside the loop formed by the fixing belt 20 and disposed opposite the pressure roller 21. The nip formation pad 56 is supported by the stay 24. The nip formation pad 56 sandwiches the fixing belt 20 together with the pressure roller 21, thereby forming the fixing nip N.

Next, the fixing device 9 illustrated in FIG. 23 omits the above-described pressurization roller 55 and includes the heater 22 formed to be arc having a curvature of the fixing belt 20 to keep a circumferential contact length between the fixing belt 20 and the heater 22. Other parts of the fixing device 9 illustrated in FIG. 23 are the same as the fixing device 9 illustrated in FIG. 22.

The above-described fixing devices in FIGS. 22 and 23 also includes the resistive heat generators 31 in the heater 22 and has the separation area B defined by neighboring resistive heat generators 31, and the separation area B similarly generates a smaller heat amount than the other area of the heater 22 and decreases the thermal expansion of the pressure roller 21. Accordingly, the pressure roller 21 similar to that of the above-described embodiment can prevent the occurrence of wrinkles in the sheet.

The image forming apparatus according to the present embodiments of the present disclosure is applicable not only to the color image forming apparatus 100 illustrated in FIG. 1 but also to a monochrome image forming apparatus, a copier, a printer, a facsimile machine, or a multifunction peripheral including at least two functions of the copier, printer, and facsimile machine.

Figure 24:
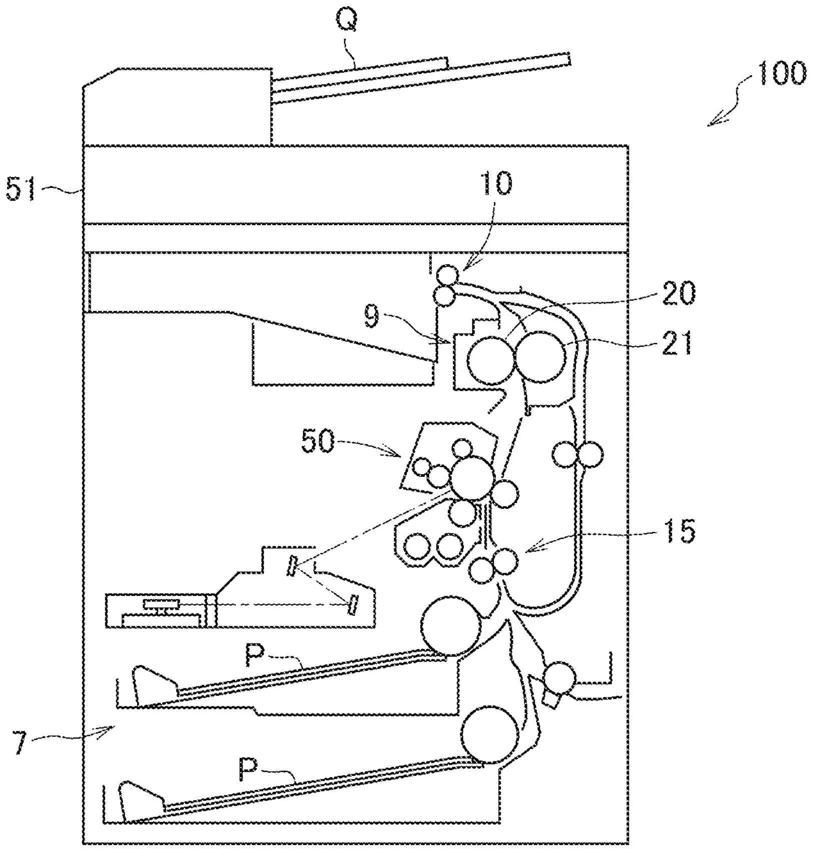
FIG. 24 is a schematic diagram illustrating a configuration of an image forming apparatus different from the image forming apparatus of FIG. 1.

For example, as illustrated in FIG. 24, an image forming apparatus 100 according to the present embodiment includes an image forming device 50 including a photoconductor drum and the like, a sheet conveyer including a timing roller pair 15 and the like, a sheet feeder 7, a fixing device 9, a sheet ejection device 10, and a reading device 51. The sheet feeder 7 includes a plurality of sheet feeding trays, and the sheet feeding trays stores sheets of different sizes, respectively.

The reading device 51 reads an image of a document Q. The reading device 51 generates image data from the read image. The sheet feeder 7 stores a plurality of sheets P and feeds the sheet P to a conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, an exposure device, a developing device, a supply device, a transfer roller, a cleaning device, and a discharger. The toner image is, for example, an image of the document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 25:
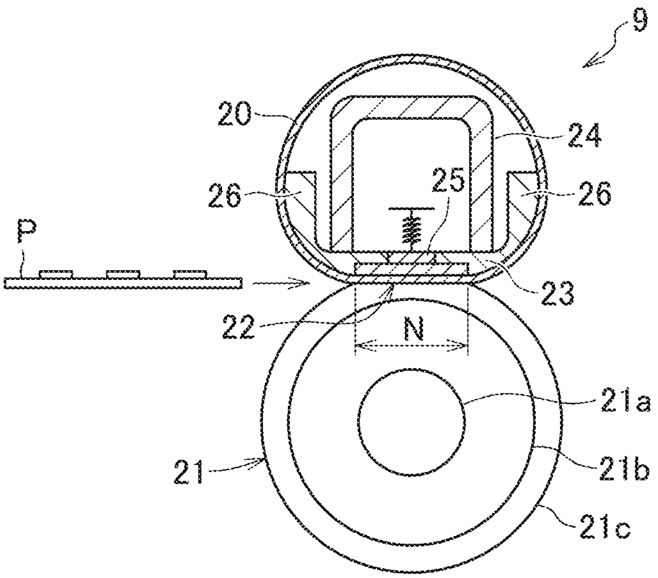
FIG. 25 is a schematic sectional view of a fixing device according to an embodiment of the present disclosure.

As illustrated in FIG. 25, the fixing device 9 includes a fixing belt 20, a pressure roller 21, a heater 22, a heater holder 23, a stay 24, and a thermistor 25.

A fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and a release layer and does not include an elastic layer. The release layer is made of a heat-resistant film material made of, for example, a fluororesin. The outer loop diameter of the fixing belt 20 is about 24 mm.

The pressure roller 21 includes a core 21*a*, an elastic layer 21*b*, and a release layer 21*c*. The pressure roller 21 has an outer diameter of 24 to 30 mm, and the elastic layer 21*b* has a thickness of 3 to 4 mm.

The heater 22 includes a base, a thermal insulation layer, a conductor layer including a resistive heat generator and the like, and an insulating layer, and is formed to have a thickness of 1 mm as a whole. A width Y1 of the heater 22 in the direction intersecting the arrangement direction is 13 mm.

Figure 26:
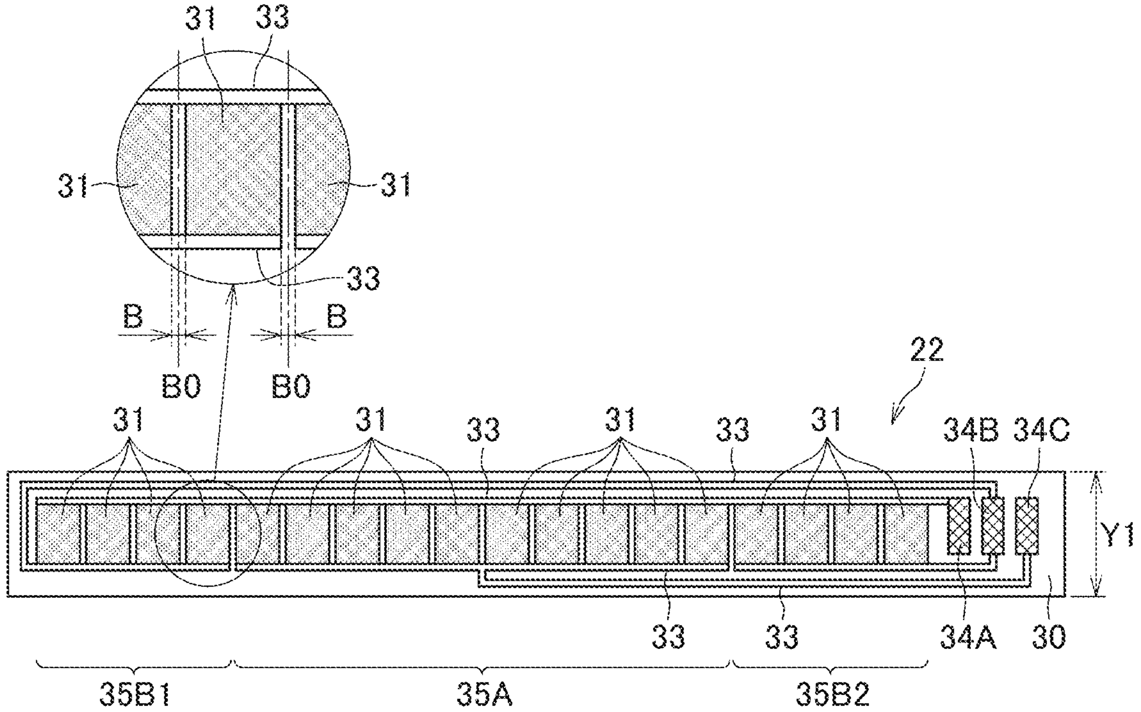
FIG. 26 is a plan view of a heater in the fixing device of FIG. 25.

As illustrated in FIG. 26, the conductor layer of the heater 22 includes a plurality of resistive heat generators 31 arranged in the arrangement direction, power supply lines 33, and electrodes 34A to 34C. As illustrated in the enlarged view of FIG. 26, the separation area B is formed between neighboring resistive heat generators of the plurality of resistive heat generators 31 arranged in the arrangement direction. The enlarged view of FIG. 26 illustrates two separation areas B, but the separation area B is formed between neighboring the resistive heat generators of all the plurality of resistive heat generators 31. The resistive heat generators 31 configure three heat generation portions 35A, 35B1, and 35B2. When a current flows between the electrodes 34A and 34B, the heat generation portions 35B1 and 35B2 generate heat. When a current flows between the electrodes 34A and 34C, the heat generation portion 35A generates heat. When the fixing device 9 fixes the toner image to the small sheet, the heat generation portion 35A generates heat. When the fixing device 9 fixes the toner image to the large sheet, all the heat generation portions 35A, 35B1 and 35B2 generate heat.

Figure 27:
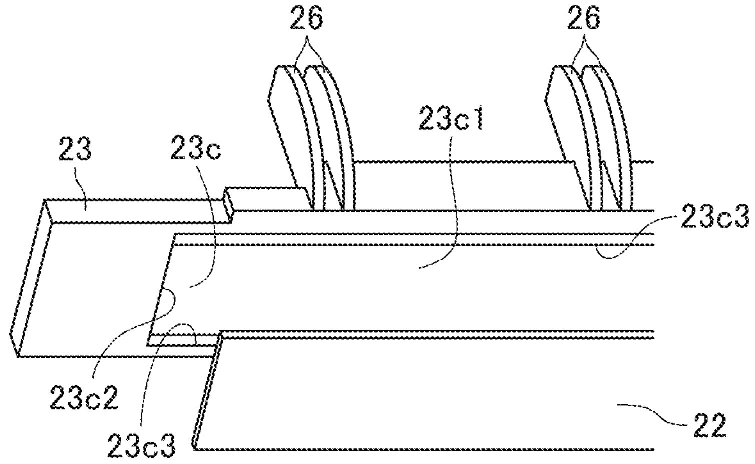
FIG. 27 is a perspective view of the heater and the heater holder in the fixing device of FIG. 25.

As illustrated in FIG. 27, the heater holder 23 holds the heater 22 in a recessed portion 23*c* of the heater holder 23. The recessed portion 23*c* is formed on the side of the heater holder 23 facing the heater 22. The recessed portion 23*c* has a bottom surface 23*c*1 and walls 23*c*2 and 23*c*3. The bottom surface 23*c*1 is substantially parallel to the base 30 and the surface recessed from the side of the heater holder 23 toward the stay 24. The walls 23*c*2 are both side surfaces of the recessed portion 23*c* in the arrangement direction. The recessed portion 23*c* may have one wall 23*c*2. The walls 23*c*3 are both side surfaces of the recessed portion 23*c* in the direction intersecting the arrangement direction. The heater holder 23 has guides 26. The heater holder 23 is made of liquid crystal polymer (LCP).

Figure 28:
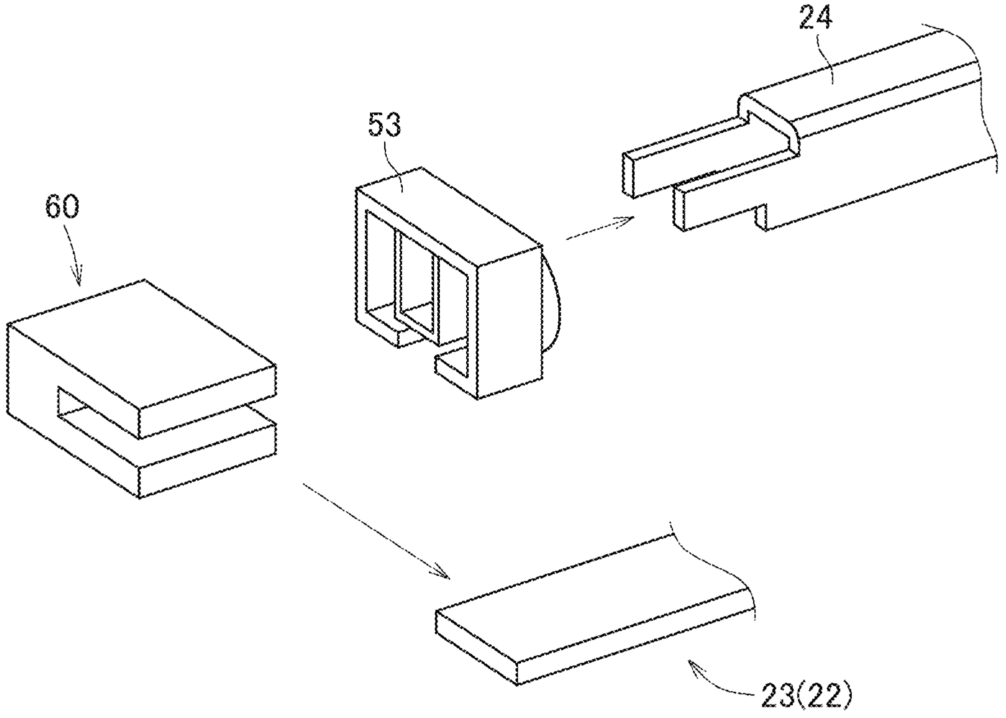
FIG. 28 is a perspective view of a connector attached to the heater.

As illustrated in FIG. 28, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply provided in the image forming apparatus via the connector 60. The above-described configuration enables the power supply to supply power to the heat generation portions 35. Note that at least part of each of the electrodes 34 is not coated by the insulation layer and therefore exposed to secure connection with the connector 60.

The flange 53 contacts the inner circumferential surface of the fixing belt 20 at each of both ends of the fixing belt 20 in the arrangement direction to hold the fixing belt 20. The flange 53 is fixed to a housing of the fixing device 9. The flange 53 is inserted into each of both ends of the stay 24 (see an arrow direction from the flange 53 in FIG. 28).

To attach to the heater 22 and the heater holder 23, the connector 70 is moved in the direction intersecting the arrangement direction (see a direction indicated by arrow from the connector 60 in FIG. 28). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other one of the connector 60 and the heater holder 23 and relatively move in the recessed portions to attach the connector 60 to the heater holder 23. The connector 60 is attached to one end of the heater 22 and one end of the heater holder 23 in the arrangement direction. The one end of the heater 22 and one end of the heater holder 23 are farther from a portion in which the pressure roller 21 receives a driving force from a drive motor than the other end of the heater 22 and the other end of the heater holder 23, respectively.

Figure 29:
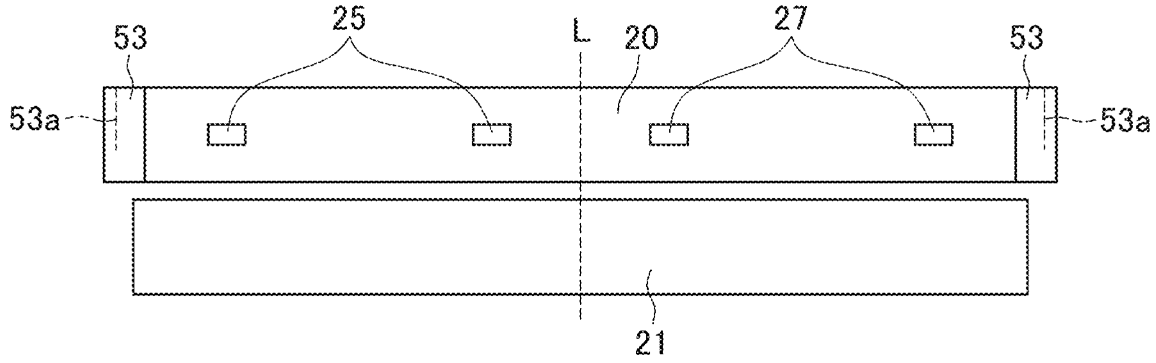
FIG. 29 is a schematic diagram illustrating an arrangement of thermistors and thermostats.

As illustrated in FIG. 29, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25. Similar to the above-described embodiments, any one of the thermistors 25 is disposed corresponding to the separation area defined by neighboring resistive heat generators of the heater 22.

As illustrated in FIG. 29, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current flowing to the heater 22 in response to a detection of a temperature of the fixing belt 20 higher than a predetermined threshold value.

Flanges 53 are disposed at both ends of the fixing belt 20 in the arrangement direction and hold both ends of the fixing belt 20, respectively. The flange 53 is made of liquid crystal polymer (LCP).

Figure 30:
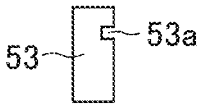
FIG. 30 is a schematic diagram illustrating a groove of a flange.

As illustrated in FIG. 30, the flange 53 has a slide groove 53*a*. The slide groove 53*a* extends in a direction in which the fixing belt 20 moves toward and away from the pressure roller 21. An engaging portion of a housing of the fixing device 9 is engaged with the slide groove 53*a*. The relative movement of the engaging portion in the slide groove 53*a* enables the fixing belt 20 to move toward and away from the pressure roller 21.

The above-described fixing devices 9 also have the separation area B defined by neighboring resistive heat generators 31, which causes the temperature drop of the fixing belt and the pressure roller 21. Accordingly, the pressure roller 21 configured as the above-described embodiments can prevent the occurrence of wrinkles in the sheet.

The sheets P serving as recording media and heated members may be thick paper, postcards, envelopes, plain paper, thin paper, coated paper, art paper, tracing paper, overhead projector (OHP) transparencies, plastic film, prepreg, copper foil, and the like.

A heating device according to the present disclosure is not limited to the fixing device described in the above embodiments. The heating device according to the present disclosure is also applicable to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating device can prevent the occurrence of wrinkles in the heated member.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:

a heater including a base and a plurality of resistive heat generators arranged on the base in an arrangement direction, separated from each other, and forming a heat generation area, the heater having separation areas that each include an entire gap between neighboring ones of the plurality of resistive heat generators in the arrangement direction;

a rotator;

a pressure rotator configured to press the rotator, the pressure rotator including:

a first region facing a first range of the heater, the first range being 20 mm from a center position of the heat generation area toward an end of the heat generation area in the arrangement direction, the first region having an outer diameter increasing in a direction from the center position of the heat generation area toward the end of the heat generation area, the first region based on a central separation area of the heater; and a second region facing at least a part of a second range of the heater, the second range different from the first range, the second range being 30 mm from a center position of the separation area toward the center position of the heat generation area, the second region having an outer diameter increasing at an increasing rate larger than an increasing rate of the outer diameter of the first region in the direction from the center position of the heat generation area toward the end of the heat generation area, the second region based on a peripheral separation area of the heater;

wherein the pressure rotator has an inflection point facing a position of the heater that is 10 mm or more from the center position of the separation area toward the center position of the heat generation area in the arrangement direction, wherein the first region extends from the inflection point toward a position being on the pressure rotator and facing the center position of the heat generation area, and wherein the second region extends in an opposite direction of the first region from the inflection point toward a position being on the pressure rotator and facing the end of the heat generation area.

2. The heating device according to claim 1, wherein the inflection point faces a position of the heater in a range of 30 mm from the center position of the separation area toward the center position (C0) of the heat generation area.

3. The heating device according to claim 1, wherein the pressure rotator has an inflection point between a position being on the pressure rotator and facing the center position of the separation area and an end of the pressure rotator opposite the second region with respect to the position being on the pressure rotator and facing the center position of the separation area, and wherein, in a part of a range from the inflection point to the end of the pressure rotator, an outer diameter of the pressure rotator increases at an increasing rate in a direction from the inflection point to the end of the pressure rotator, the increasing rate in the part being smaller than the increasing rate of the outer diameter of the second region.

4. The heating device according to claim 1, further comprising a holder holding the heater, wherein a center portion of the holder in the arrangement direction protrudes from an end of the holder in the arrangement direction toward the pressure rotator.

5. The heating device according to claim 1, wherein a longitudinal direction of the heater is same as the arrangement direction, wherein the heater includes a plurality of rows each including the plurality of resistive heat generators, and the plurality of rows are arranged in a direction intersecting the arrangement direction and a direction along a surface of the base on which the plurality of resistive heat generators are arranged, and wherein a position of the separation area in the longitudinal direction in a first row of the plurality of rows is different from a position of the separation area in the longitudinal direction in a second row of the plurality of rows.

6. The heating device according to claim 1, wherein each of the plurality of resistive heat generators is configured by meandering a line-shaped resistive heat generator and has a folded portion having an acute folding angle.

7. The heating device according to claim 1, wherein the heater is in direct contact with the rotator.

8. The heating device according to claim 1, wherein the heater has a thickness equal to or smaller than 1.1 mm.

9. The heating device according to claim 1, wherein the base has a thermal conductivity of equal to or smaller than 100 W/m×K.

10. A fixing device comprising the heating device according to claim 1.

11. An image forming apparatus comprising the heating device according to claim 1.

12. A heating device comprising:

a heater including a base and a plurality of resistive heat generators arranged on the base in an arrangement direction, separated from each other, and forming a heat generation area, the heater having a separation area that includes an entire gap between neighboring ones of the plurality of resistive heat generators in the arrangement direction;

a rotator; and a pressure rotator configured to press the rotator, the pressure rotator including a first region and a second region, the second region including a position corresponding to the separation area, the second region facing a part of a range of the heater from a center position of the separation area to a center position of the heat generation area, the second region having an outer diameter increasing in a direction from the center position of the heat generation area toward an end of the heat generation area, the second region based on a peripheral separation area of the heater, and the first region nearer to a position being on the pressure rotator and facing the center position of the heat generation area than the second region, the first region having an outer diameter increasing at an increasing rate smaller than an increasing rate of the outer diameter of the second region in the direction from the center position of the heat generation area toward the end of the heat generation area, the first region based on a central separation area of the heater;

wherein the pressure rotator has an inflection point between a position being on the pressure rotator and facing the center position of the separation area and an end of the pressure rotator opposite the second region with respect to the position being on the pressure rotator and facing the center position of the separation area, and wherein, in a part of a range from the inflection point to the end of the pressure rotator, an outer diameter of the pressure rotator increases at an increasing rate in a direction from the inflection point to the end of the pressure rotator, the increasing rate in the part being smaller than the increasing rate of the outer diameter of the second region.

13. The heating device according to claim 12, further comprising a holder holding the heater, wherein a center portion of the holder in the arrangement direction protrudes from an end of the holder in the arrangement direction toward the pressure rotator.

14. A fixing device comprising the heating device according to claim 12.

15. An image forming apparatus comprising the heating device according to claim 12.

* * * * *